(12) United States Patent
Hirose et al.

(10) Patent No.: US 11,462,919 B2
(45) Date of Patent: Oct. 4, 2022

(54) SECONDARY BATTERY SYSTEM AND CONNECTION CIRCUIT

(71) Applicant: KABUSHIKI KAISHA TOYOTA JIDOSHOKKI, Kariya (JP)

(72) Inventors: Shinji Hirose, Aichi-ken (JP); Toshinari Fukatsu, Aichi-ken (JP)

(73) Assignee: KABUSKIKI KAISHA TOYOTA JIDOSHOKKI, Kariya (JP)

( * ) Notice: Subject to any disclaimer, the term of this patent is extended or adjusted under 35 U.S.C. 154(b) by 113 days.

(21) Appl. No.: 17/015,401

(22) Filed: Sep. 9, 2020

(65) Prior Publication Data

US 2021/0083488 A1 Mar. 18, 2021

(30) Foreign Application Priority Data

Sep. 12, 2019 (JP) .............................. JP2019-166600

(51) Int. Cl.
*H02J 7/00* (2006.01)
(52) U.S. Cl.
CPC .................................. *H02J 7/0024* (2013.01)
(58) Field of Classification Search
USPC ......................................................... 320/117
See application file for complete search history.

(56) References Cited

U.S. PATENT DOCUMENTS

| | | |
|---|---|---|
| 2001/0005125 A1 | 6/2001 | Nagai et al. |
| 2010/0136449 A1 | 6/2010 | Yanase et al. |
| 2016/0233694 A1* | 8/2016 | Koenen ............. H01M 10/0525 |
| 2017/0310126 A1 | 10/2017 | Nguyen |
| 2018/0109122 A1* | 4/2018 | Koerner .............. H01M 10/482 |
| 2019/0089169 A1* | 3/2019 | Okamura ................ B60L 58/19 |
| 2020/0274370 A1* | 8/2020 | Krieg ..................... H02J 7/0024 |

FOREIGN PATENT DOCUMENTS

| | | |
|---|---|---|
| CN | 101582517 A | 11/2009 |
| CN | 108370173 A | 8/2018 |
| DE | 102016223470 A1 | 6/2017 |

(Continued)

OTHER PUBLICATIONS

Communication dated Nov. 5, 2020, from the European Patent Office in European Application No. 20190420.8.

*Primary Examiner* — Samuel Berhanu
(74) *Attorney, Agent, or Firm* — Sughrue Mion, PLLC

(57) ABSTRACT

A secondary battery system of connecting secondary batteries includes first output-unit switches, second output-unit switches, series-connection switches, a positive-side discharging output unit connected to second terminals of the first output-unit switches, a negative-side discharging output unit connected to second terminals of the second output-unit switches, a positive-side charging input unit connected between a positive terminal of one of the secondary batteries at one end of the secondary batteries and a first terminal of one of the first output-unit switches associated with the one of the secondary batteries at the one end of the secondary batteries, a negative-side charging input unit connected between a negative terminal of one of the secondary batteries at the other end of the secondary batteries and a first terminal of one of the second output-unit switches associated with the one of the secondary batteries at the other end of the secondary batteries, and a control unit.

6 Claims, 2 Drawing Sheets

(56) References Cited

FOREIGN PATENT DOCUMENTS

| EP | 1113563 A2 | 7/2001 |
|---|---|---|
| JP | 2008148387 A | 6/2008 |
| JP | 2019-054677 A | 4/2019 |
| KR | 10-2011-0096995 A | 8/2011 |
| WO | 2009/008227 A1 | 1/2009 |
| WO | 2015112178 A2 | 7/2015 |

* cited by examiner

SECONDARY BATTERY SYSTEM AND CONNECTION CIRCUIT

CROSS-REFERENCE TO RELATED APPLICATION

This application claims priority to Japanese Patent Application No. 2019-186600 filed on Sep. 12, 2019, the entire disclosure of which is incorporated herein by reference.

BACKGROUND ART

The present disclosure relates to a secondary battery system and a connection circuit in which a plurality of secondary batteries is connected in series or parallel and that is used for the secondary battery system.

FIG. 2 is a diagram showing an existing connection circuit.

The connection circuit shown in FIG. 2 includes a positive-side input-output unit Tp, a negative-side input-output unit Tn, first output-unit switches SW11 to SW15, second output-unit switches SW21 to SW25, and series-connection switches SWs1 to SWs5. The first output-unit switches SW11 to SW15, the second output-unit switches SW21 to SW25, and the series-connection switches SWs1 to SWs5 are provided by semiconductor switches such as a metal-oxide-semiconductor field-effect transistor (MOSFET).

The first output-unit switches SW11 to SW15 are connected between respective positive terminals of secondary batteries B1 to B5 and the positive-side input-output unit Tp.

The second output-unit switches SW21 to SW25 are connected between respective negative terminals of the secondary batteries B1 to B5 and the negative-side input-output unit Tn.

The series-connection switch SWs1 is connected between the negative terminal of the secondary battery B1 and the positive terminal of the secondary battery B2, the series-connection switch SWs2 is connected between the negative terminal of the secondary battery B2 and the positive terminal of the secondary battery B3, the series-connection switch SWs3 is connected between the negative terminal of the secondary battery B3 and the positive terminal of the secondary battery B4, the series-connection switch SWs4 is connected between the negative terminal of the secondary battery B4 and the positive terminal of the secondary battery B5, and the series-connection switch SWs5 is connected between the negative terminal of the secondary battery B5 and the positive terminal of the secondary battery B1.

When the secondary batteries B1 to B5 are to be connected in series to one another, the first output-unit switch SW11, the second output-unit switch SW25, and the series-connection switches SWs1 to SWs4 are turned on to conduct electric current, whereas the first output-unit switches SW12 to SW15, the second output-unit switches SW21 to SW24, and the series-connection switch SWs5 are turned off to block the electric current.

When the secondary batteries B1 to B5 are to be connected in parallel to one another, the first output-unit switches SW11 to SW15 and the second output-unit switches SW21 to SW25 are turned on to conduct the electric current, whereas the series-connection switches SWs1 to SWs5 are turned off to block the electric current.

When the secondary batteries B1 to B5 are arranged in this order, and the secondary batteries B1 and B5 alone are to be connected in series to each other, the first output-unit switch SW15, the second output-unit switch SW21, and the series-connection switch SWs5 are turned on to conduct the electric current, whereas the first output-unit switches SW11 to SW14, the second output-unit switches SW22 to SW25, and the series-connection switches SWs1 to SWs4 are turned off to block the electric current.

Japanese Patent Application Publication No. 2019-54677 is related to the above-described technology.

In some cases, when the secondary batteries are to be charged, connection of the secondary batteries may desirably be switched between series and parallel depending on the status of each of the secondary batteries. In the connection circuit shown in FIG. 2, when the secondary batteries B1, B3, and B5 to be charged and the secondary batteries B2 and B4 not to be charged are arranged in the order of the secondary batteries B1 to B5, the secondary batteries B1 and B5 adjacent to each other are allowed to be connected in series to each other via the series-connection switch SWs5. However, the secondary battery B3 is not allowed to be connected in series to the secondary battery B1 or B5 via any of the series-connection switches SWs1 to SWs4 because the secondary battery B3 is not adjacent to the secondary batteries B1 and B5. This arises concern that the secondary battery B3 alone may not be charged among the secondary batteries B1, B3, and B5. In the case where the secondary batteries B1, B3, and B5 are connected in parallel to each other after the secondary batteries B1 and B5 alone are charged among the secondary batteries B1, B3 and B5, a relatively high electric current may low back through the secondary batteries B1, B3, and B5 owing to difference in capacity (voltage) among the secondary batteries B1, B3, and B5.

The present disclosure has been made in view of the above circumstances and is directed to providing a secondary battery system and a connection circuit in which a plurality of secondary batteries is connected in series or parallel and that is used for the secondary battery system, which allow all the secondary batteries to be connected in series and also allow connection of the secondary batteries to be switched between series and parallel.

SUMMARY

In accordance with an aspect of the present disclosure, there is provided a secondary battery system of connecting a plurality of secondary batteries in series or in parallel to one another. The secondary battery system includes a plurality of first output-unit switches, a plurality of second output-unit switches, and a plurality of series-connection switches. First terminals of the plurality of first output-unit switches are connected to respective positive terminals of the plurality of secondary batteries. First terminals of the plurality of second output-unit switches are connected to respective negative terminals of the plurality of secondary batteries. Each of the plurality of series-connection switches is connected between the negative terminal of one of any two of the plurality of secondary batteries adjacent to each other and the positive terminal of the other of the two of the plurality of secondary batteries. The secondary battery system further include a positive-side discharging output unit, a negative-side discharging output unit, a positive-side charging input unit, a negative-side charging input unit, and a control unit. The positive-side discharging output unit is connected to second terminals of the plurality of first output-unit switches. The negative-side discharging output unit is connected to second terminals of the plurality of second output-unit switches. The positive-side charging input unit is connected between the positive terminal of one of the plurality of secondary batteries that is disposed at one end of the plurality of secondary batteries and the first terminal of one of the plurality of first output-unit switches that is associated with the one of the plurality of secondary batteries disposed at the one end of the plurality of secondary batteries. The negative-side charging input unit is connected between the negative terminal of one of the plurality of secondary batteries that is disposed at the other end of the plurality of secondary batteries and the first terminal of one of the plurality of second output-unit switches that is associated with the one of the plurality of secondary batteries disposed at the other end of the plurality of secondary batteries. The control unit turns on the plurality of series-connection switches to conduct electric current and turns off the plurality of first output-unit switches and the plurality of second output-unit switches to block the electric current when the plurality of secondary batteries is to be connected in series to one another. The control unit also turns on the plurality of first output-unit switches and the plurality of second output-unit switches to conduct the electric current and turns off the plurality of series-connection switches to block the electric current when the plurality of secondary batteries is to be connected in parallel to one another.

In accordance with another aspect of the present disclosure, there is provided a connection circuit of a secondary battery system. The connection circuit includes a plurality of secondary batteries, a plurality of first output-unit switches, a plurality of second output-unit switches, and a plurality of series-connection switches. First terminals of the plurality of first output-unit switches are connected to respective positive terminals of the plurality of secondary batteries. First terminals of the plurality of second output-unit switches are connected to respective negative terminals of the plurality of secondary batteries. Each of the plurality of series-connection switches is connected between the negative terminal of one of any two of the plurality of secondary batteries adjacent to each other and the positive terminal of the other of the two of the plurality of secondary batteries. The connection circuit further includes a positive-side discharging output unit, a negative-side discharging output unit, a positive-side charging input unit, and a negative-side charging input unit. The positive-side discharging output unit is connected to second terminals of the plurality of first output-unit switches. The negative-side discharging output unit is connected to second terminals of the plurality of second output-unit switches. The positive-side charging input unit is connected between the positive terminal of one of the plurality of secondary batteries that is disposed at one end of the plurality of secondary batteries and the first terminal of the one of the plurality of first output-unit switches that is associated with the one of the plurality of secondary batteries disposed at the one end of the plurality of secondary batteries. The negative-side charging input unit is connected between the negative terminal of one of the plurality of secondary batteries that is disposed at the other end of the plurality of secondary batteries and the first terminal of one of the plurality of second output-unit switches that is associated with the one of the plurality of secondary batteries disposed at the other end of the plurality of secondary batteries. The plurality of series-connection switches is turned on to conduct electric current and the plurality of first output-unit switches and the plurality of second output-unit switches are turned off to block the electric current when the plurality of secondary batteries is to be connected in series to one another, and the plurality of first output-unit switches and the plurality of second output-unit switches are turned on to conduct the electric current and the plurality of series-connection switches is turned off to block the electric current when the plurality of secondary batteries is to be connected in parallel to one another.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

An embodiment of the present disclosure will be described in detail below with reference to FIG. 1.

Figure 1:
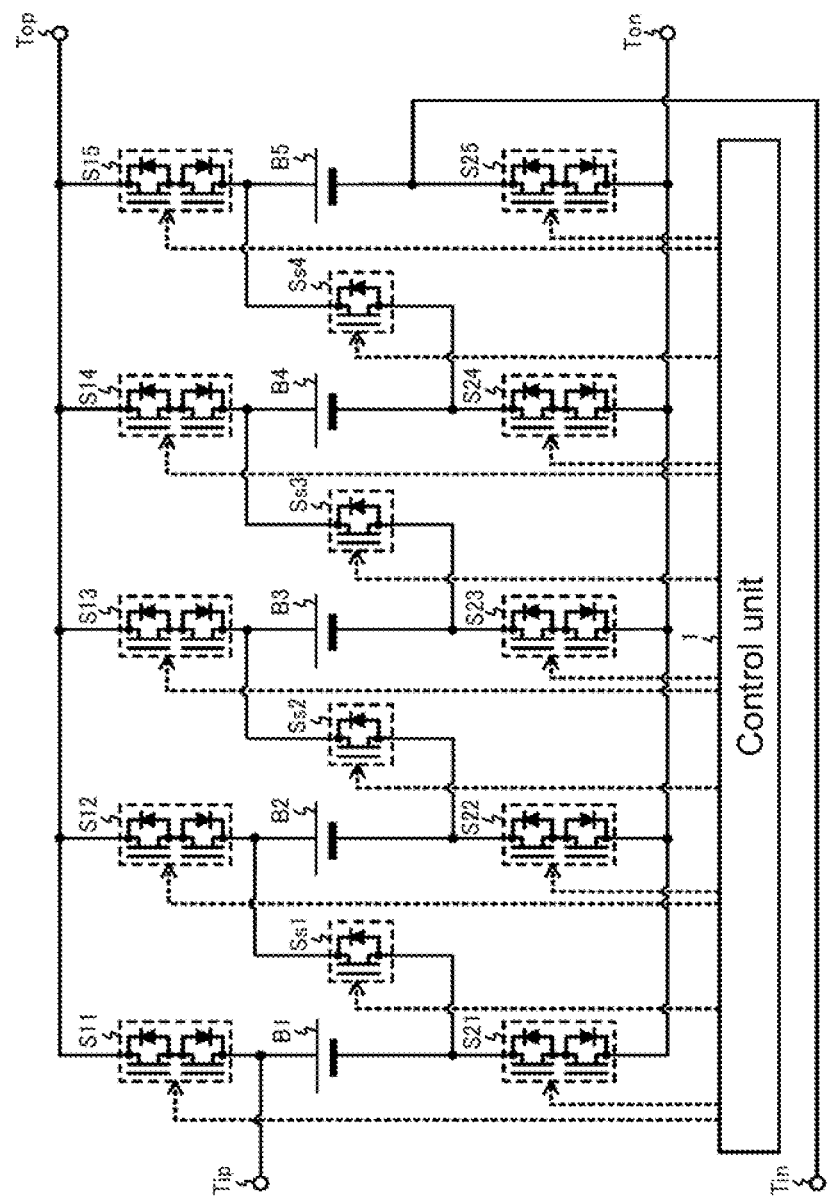
FIG. 1 is a diagram showing an exemplary secondary battery system according to an embodiment of the present disclosure.

FIG. 1 is a diagram showing an exemplary secondary battery system according to the embodiment of the present disclosure.

The secondary battery system shown in FIG. 1 includes secondary batteries B1 to B5, a positive-side charging input unit Tip, a negative-side charging input unit Tin, a positive-side discharging output unit Top, a negative-side discharging output unit Ton, first output-unit switches S11 to S15, second output-unit switches S21 to S25, series-connection switches Ss1 to Ss4, and a control unit 1. The secondary battery system shown in FIG. 1 is to be mounted on a vehicle such as a forklift and an electric vehicle. The secondary batteries B1 to B5 are referred to as secondary batteries B when they are not distinguished from one another in particular. The first output-unit switches S11 to S15 are referred to as first output-unit switches S1 when they are not distinguished from one another in particular. The second output-unit switches S21 to S25 are referred to as second output-unit switches S2 when they are not distinguished from one another in particular. The series-connection switches Ss1 to Ss4 are referred to as series-connection switches Ss when they are not distinguished from one another in particular. The numbers of the secondary batteries B, the first output-unit switches S1, and the second output-unit switches S2 are not limited to five. The number of the series-connection switches Ss is not limited to four.

Each of the secondary batteries B1 to B5 is provided by one or more rechargeable and dischargeable cells such as a lithium-ion cell and a nickel-hydride cell.

Each of the first output-unit switches S11 to S15 includes a first semiconductor switch (such as a MOSFET) and a second semiconductor switch (such as a MOSFET) that are connected in series to each other. The first semiconductor switch includes a first diode connected between a source terminal and a drain terminal of the first semiconductor switch, and the second semiconductor switch includes a second diode connected between a source terminal and a drain terminal of the second semiconductor switch. A forward electric current flows through the first diode in a direction opposite to a forward electric current of the second diode. For example, the drain terminal of the first semiconductor switch is connected to a cathode terminal of the first diode. The source terminal of the first semiconductor switch is connected to an anode terminal of the first diode, the source terminal of the second semiconductor switch, and an anode terminal of the second diode. The drain terminal of the second semiconductor switch is connected to a cathode terminal of the second diode. First terminals (the drain terminals of the first semiconductor switches) of the first output-unit switches S11 to S15 are connected to respective positive terminals of the secondary batteries B1 to B5, whereas second terminals (the drain terminals of the second semiconductor switches) of the first output-unit switches S11 to S15 are connected to the positive-side discharging output unit Top. In other words, the first terminal of the first output-unit switch S11 is connected to the positive terminal of the secondary battery B1, whereas the second terminal of the first output-unit switch S11 is connected to the positive-side discharging output unit Top. The first terminal of the first output-unit switch S12 is connected to the positive terminal of the secondary battery B2, whereas the second terminal of the first output-unit switch S12 is connected to the positive-side discharging output unit Top. The first terminal of the first output-unit switch S13 is connected to the positive terminal of the secondary battery B3, whereas the second terminal of the first output-unit switch S13 is connected to the positive-side discharging output unit Top. The first terminal of the first output-unit switch S14 is connected to the positive terminal of the secondary battery B4, whereas the second terminal of the first output-unit switch S14 is connected to the positive-side discharging output unit Top. The first terminal of the first output-unit switch S15 is connected to the positive terminal of the secondary battery B5, whereas the second terminal of the first output-unit switch S15 is connected to the positive-side discharging output unit Top. The first output-unit switches S11 to S15 may be provided by, for example, mechanical relays that are electrically switchable between on for conduction and off for blocking, corresponding to a signal from the control unit 1.

Like the first output-unit switches S11 to S15, each of the second output-unit switches S21 to S25 includes a first semiconductor switch (such as a MOSFET) and a second semiconductor switch (such as a MOSFET) that are connected in series to each other. The first semiconductor switch includes a first diode connected between a source terminal and a drain terminal of the first semiconductor switch, and the second semiconductor switch includes a second diode connected between a source terminal and a drain terminal of the second semiconductor switch. A forward electric current of the second diode flows in a direction opposite to a forward electric current of the first diode. First terminals (the drain terminals of the first semiconductor switches) of the second output-unit switches S21 to S25 are connected to respective negative terminals of the secondary batteries B1 to B5, whereas second terminals (the drain terminals of the second semiconductor switches) of the second output-unit switches S21 to S25 are connected to the negative-side discharging output unit Ton. In other words, the first terminal of the second output-unit switch S21 is connected to the negative terminal of the secondary battery B1, whereas the second terminal of the second output-unit switch S21 is connected to the negative-side discharging output unit Ton. The first terminal of the second output-unit switch S22 is connected to the negative terminal of the secondary battery B2, whereas the second terminal of the second output-unit switch S22 is connected to the negative-side discharging output unit Ton. The first terminal of the second output-unit switch S23 is connected to the negative terminal of the secondary battery B3, whereas the second terminal of the second output-unit switch S23 is connected to the negative-side discharging output unit Ton. The first terminal of the second output-unit switch S24 is connected to the negative terminal of the secondary battery B4, whereas the second terminal of the second output-unit switch S24 is connected to the negative-side discharging output unit Ton. The first terminal of the second output-unit switch S25 is connected to the negative terminal of the secondary battery B5, whereas the second terminal of the second output-unit switch S25 is connected to the negative-side discharging output unit Ton. The second output-unit switches S21 to S25 may be provided by, for example, mechanical relays that are electrically switchable between on for conduction and off for blocking, corresponding to a signal from the control unit 1.

The above configuration prevents the electric current from flowing through the first output-unit switches S1, the second output-unit switches S2, and the series-connection switches Ss when the first output-unit switches S1 and the second output-unit switches S2 are turned off to block the electric current.

The series-connection switches Ss1 to Ss4 are provided by semiconductor switches such as a MOSFET. Each of the series-connection switches Ss1 to Ss4 is connected between the negative terminal of one of any two of the secondary batteries B adjacent to each other and the positive terminal of the other of the two. In other words, the series-connection switch Ss1 is connected between the negative terminal of the one of the adjacent secondary batteries B1 and B2, i.e. the secondary battery B1, and the positive terminal of the other of the adjacent secondary batteries B1 and B2, i.e. the secondary battery B2. The series-connection switch Ss2 is connected between the negative terminal of the one of the adjacent secondary batteries B2 and B3, i.e. the secondary battery B2, and the positive terminal of the other of the adjacent secondary batteries B2 and B3, i.e. the secondary battery B3. The series-connection switch Ss3 is connected between the negative terminal of the one of the adjacent secondary batteries B3 and B4, i.e. the secondary battery B3, and the positive terminal of the other of the adjacent secondary batteries B3 and B4, i.e. the secondary battery B4. The series-connection switch Ss4 is connected between the negative terminal of the one of the adjacent secondary batteries B4 and B5, i.e. the secondary battery B4 and the positive terminal of the other of the adjacent secondary batteries B4 and B5, i.e. the secondary battery B5. Each of the series-connection switches Ss1 to Ss4 may be provided by a diode that allows the electric current flowing from the negative terminal of the one of any two of the secondary batteries B adjacent to each other toward the positive terminal of the other of the two, or may be provided by, for example, a mechanical relay that is switchable between on for conduction and off for blocking, corresponding to a signal from the control unit 1. In other words, a configuration of the series-connection switches Ss is acceptable as far as the electric current flows from the negative terminal of the one of the secondary batteries B adjacent to each other toward the positive terminal of the other of the secondary batteries B adjacent to each other when the secondary batteries B are connected in series but the electric current does not flow from the positive terminal of the other of the secondary batteries B adjacent to each other toward the negative terminal of the one of the secondary batteries B adjacent to each other when the secondary batteries B are connected in parallel.

The positive-side charging input unit Tip is connected between the positive terminal of the secondary battery B1 disposed at one end of the secondary batteries B1 to B5, and the first terminal of the first output-unit switch S11 associated with the secondary battery B1. The secondary batteries B1 to B5 are arranged in the order from the secondary battery B1 (a first secondary battery), the secondary battery B2 (a second secondary battery), the secondary battery B3 (a third secondary battery), the secondary battery B4 (a fourth secondary battery), and the secondary battery B5 (a fifth secondary battery).

The negative-side charging input unit Tin is connected between the negative terminal of the secondary battery B5 disposed at the other end of the secondary batteries B1 to B5, and the first terminal of the second output-unit switch S25 associated with the secondary battery B5.

The control unit 1 includes a central processing unit (CPU), a programmable device such as a field programmable gate array (FPGA) and a programmable logic device (PLD), or the like, and controls the first output-uni switches S11 to S15, the second output-unit switches S21 to S25, and the series-connection switches Ss1 to Ss4, depending on whether to charge or discharge any of the secondary batteries B1 to B5.

In other words, the control unit 1 controls the first output-unit switches S11 to S15, the second output-unit switches S21 to S25, and the series-connection switches Ss1 to Ss4 to connect the secondary batteries B1 to B5 in series to charge the secondary batteries B1 to B5. The control unit 1 turns on the series-connection switches Ss1 to Ss4 to conduct the electric current and turns off the first output-unit switches S11 to S15 and the second output-unit switches S21 to S25 to block the electric current, when the secondary batteries B1 to B5 are to be connected in series. Then, the electric current flows from the positive-side charging input unit Tip to the negative-side charging input unit Tin via the secondary battery B1, the series-connection switch Ss1, the secondary battery B2, the series-connection switch Ss2, the secondary battery B3, the series-connection switch Ss3, the secondary battery B4, the series-connection switch Ss4, and the secondary battery B5. The positive-side charging input unit Tip and the negative-side charging input unit Tin are terminals or electrodes that are connected to an external charging unit. This allows the electric current to flow from the external charging unit to the secondary batteries B1 to B5 via the positive-side charging input unit Tip and the negative-side charging input unit Tin, by which the secondary batteries B1 to B5 are charged. By connecting the secondary batteries B1 to B5 in series in this way to charge the secondary batteries B1 to B5, a voltage applied to the entire secondary batteries B1 to B5 becomes relatively high, which reduces the electric current flowing in the secondary batteries B1 to B5. As a result, a charging cable that connects the external charging unit to the positive-side charging input unit Tip and the negative-side charging input unit Tin is downsized, which improves a charging workability.

The control unit 1 controls the first output-unit switches S11 to S15, the second output-unit switches S21 to S25, and the series-connection switches Ss1 to Ss4 to connect the secondary batteries B1 to B5 in parallel to discharge the secondary batteries B1 to B5. The control unit 1 turns on the first output-unit switches S11 to S15 and the second output-unit switches S21 to S25 to conduct the electric current and turns off the series-connection switches Ss1 to Ss4 to block the electric current, when the secondary batteries B1 to B5 are to be connected in parallel. Then, the electric current flows from the negative-side discharging output unit Ton to the positive-side discharging output unit Top via the second output-unit switch S21, the secondary battery B1, and the first output-unit switch S11. The electric current flows from the negative-side discharging output unit Ton to the positive-side discharging output unit Top via the second output-unit switch S22, the secondary battery B2, and the first output-unit switch S12. The electric current flows from the negative-side discharging output unit Ton to the positive-side discharging output unit Top via the second output-unit switch S23, the secondary battery B3, and the first output-unit switch S13. The electric current flows from the negative-side discharging output unit Ton to the positive-side discharging output unit Top via the second output-unit switch S24, the secondary battery B4, and the first output-unit switch S14. The electric current flows from the negative-side discharging output unit Ton to the positive-side discharging output unit Top via the second output-unit switch S25, the secondary battery B5, and the first output-unit switch S15. The positive-side discharging output unit Top and the negative-side discharging output unit Ton are terminals or electrodes that are connected to a load. This allows the electric current to flow from the secondary batteries B1 to B5 to the load via the positive-side discharging output unit Top and the negative-side discharging output unit Ton, by which the secondary batteries B1 to B5 are discharged. By connecting the secondary batteries B1 to B5 in parallel in this way to discharge the secondary batteries B1 to B5, a capacity of the entire secondary batteries B is increased.

The control unit 1 determines whether any of the secondary batteries B is faulty or not. The control unit 1 determines that the secondary battery B is faulty in the case where, for example, a voltage of the secondary battery B is equal to or higher than an overvoltage threshold, a temperature of the secondary battery B is equal to or higher than an overtemperature threshold, a charging rate of the secondary battery B (e.g. a ratio of a present charge capacity to a full charge capacity of the secondary battery B) is equal to or higher than an overcharge threshold, or a degree of deterioration of the secondary battery B (e.g. the full charge capacity, an internal resistance, etc. of the secondary battery B) is equal to or higher than a deterioration threshold, or the like.

When the secondary battery B2 is faulty and only the remaining normal secondary batteries B1 and B3 to B5 are to be connected in series to one another, the control unit 1 turns on the first output-unit switches S12 and S13 and the series-connection switches Ss1, Ss3, and Ss4 to conduct the electric current and turns of the first output-unit switches S11, S14, and S15, the second output-unit switches S21 to S25, and the series-connection switch Ss2 to block the electric current. Then, the electric current flows from the positive-side charging input unit Tip to the negative-side charging input unit Tin via the secondary battery B1, the series-connection switch Ss1, the first output-unit switch S12, the first output-unit switch S13, the secondary battery B3, the series-connection switch Ss3, the secondary battery B4, the series-connection switch Ss4, and the secondary battery B5. In this way, all the normal secondary batteries B1 and B3 to B5 are charged.

Alternatively, when the secondary battery B2 is faulty and only the remaining normal secondary batteries B1 and B3 to B5 are to be connected in parallel to one another, the control unit 1 turns on the first output-unit switches S11 and S13 to S15 and the second output-unit switches S21 and S23 to S25 to conduct the electric current and turns off the first output-unit switch S12, the second output-unit switch S22, and the series-connection switches Ss1 to Ss4 to block the electric current. Then, the electric current flows from the negative-side discharging output unit Ton to the positive-side discharging output unit Top via the second output-unit switch S21, the secondary battery B1, and the first output-unit switch S11. The electric current flows from the negative-side discharging output unit Ton to the positive-side discharging output unit Top via the second output-unit switch S23, the secondary battery B3, and the first output-unit switch S13. The electric current flows from the negative-side discharging output unit Ton to the positive-side discharging output unit Top via the second output-unit switch S24, the secondary battery B4, and the first output-unit switch S14. The electric current flows from the negative-side discharging output unit Ton to the positive-side discharging output unit Top via the second output-unit switch S25, the secondary battery B5, and the first output-unit switch S15. In this way, all the normal secondary batteries B1 and B3 to B5 are discharged.

When the secondary batteries B2 and B3 are faulty and only the remaining normal secondary batteries B1, B4, and B5 are to be connected in series to one another, the control unit 1 turns on the first output-unit switches S12 and S14 and the series-connection switches Ss1 and Ss4 to conduct the electric current and turns off the first output-unit switches S11, S13, and S15, the second output-unit switches S21 to S25, and the series-connection switches Ss2 and Ss3 to block the electric current. Then, the electric current flows from the positive-side charging input unit Tip to the negative-side charging input unit Tin via the secondary battery B1, the series-connection switch Ss1, the first output-unit switch S12, the first output-unit switch S14, the secondary battery B4, the series-connection switch Ss4, and the secondary battery B5. In this way, all the normal secondary batteries B1, B4, and B5 are charged.

Alternatively, when the secondary batteries B2 and B3 are faulty and only the remaining normal secondary batteries B1, B4, and B5 are to be connected in series to one another, the control unit 1 turns on the second output-unit switches S21 and S23 and the series-connection switches Ss3 and Ss4 to conduct the electric current and turns off the first output-unit switches S11 to S15, the second output-unit switches S22, S24, and S25, and the series-connection switches Ss1 and Ss2 to block the electric current. Then, the electric current flows from the positive-side charging input unit Tip to the negative-side charging input unit Tin via the secondary battery B1, the second output-unit switch S21, the second output-unit switch S23, the series-connection switch Ss3, the secondary battery B4, the series-connection switch Ss4, and the secondary battery B5. In this way, all the normal secondary batteries B1, B4, and B5 are charged.

When the secondary batteries B2 and B4 are faulty and only the remaining normal secondary batteries B1, B3, and B5 are to be connected in series to one another, in other words, when the normal secondary batteries B1, B3, and B5 and the faulty secondary batteries B2 and B4 are arranged in the order of the secondary batteries B1 to B5 and only the secondary batteries B1, B3, and B5 are to be connected in series to one another, the control unit 1 turns on the first output-unit switches S12 and S13, the second output-unit switches S23 and S24, and the series-connection switches Ss1 and Ss4 to conduct the electric current and turns off the first output-unit switches S11, S14, and S15, the second output-unit switches S21, S22, and S25, and the series-connection switches Ss2 and Ss3 to block the electric current. Then, the electric current flows from the positive-side charging input unit Tip to the negative-side charging input unit Tin via the secondary battery B1, the series-connection switch Ss1, the first output-unit switch S12, the first output-unit switch S13, the secondary battery B3, the second output-unit switch S23, the second output-unit switch S24, the series-connection switch Ss4, and the secondary battery B5. In this way, all the normal secondary batteries B1, B3, and B5 are charged.

Alternatively, when the secondary batteries B2 and B4 are faulty and only the remaining normal secondary batteries B1, B3, and B5 are to be connected in series to one another, the control unit 1 turns on the first output-unit switches S14 and S15, the second output-unit switches S21 and S22, and the series-connection switches Ss2 and Ss3 to conduct the electric current and turns off the first output-unit switches S11 to S13, the second output-unit switches S23 to S25, and the series-connection switches Ss1 and Ss4 to block the electric current. Then, the electric current flows from the positive-side charging input unit Tip to the negative-side charging input unit Tin via the secondary battery B1, the second output-unit switch S21, the second output-unit switch S22, the series-connection switch Ss2, the secondary battery B3, the series-connection switch Ss3, the first output-unit switch S14, the first output-unit switch S15, and the secondary battery B5. In this way, all the normal secondary batteries B1, B3, and B5 are charged.

The connection circuit of this embodiment may be configured to include, for example, the positive-side charging input unit Tip, the negative-side charging input unit Tin, the positive-side discharging output unit Top, the negative-side discharging output unit Ton, a plurality of first output-unit switches S1, a plurality of second output-unit switches S2, and a plurality of series-connection switches Ss.

Figure 2:
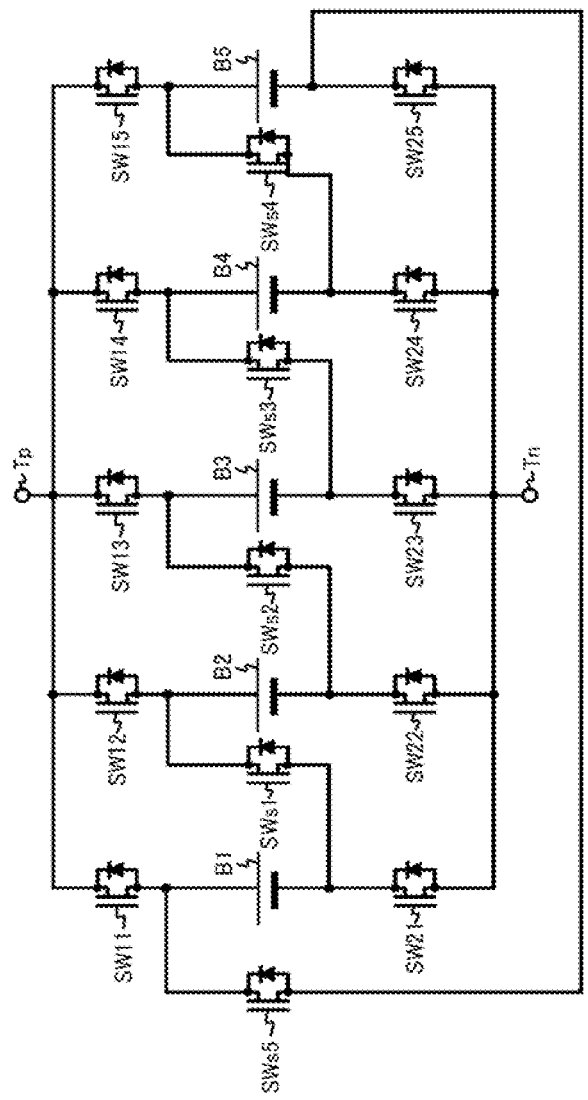
FIG. 2 is a diagram showing an existing connection circuit.

The connection circuit of this embodiment is different from the existing connection circuit shown in FIG. 2 in that the positive-side input-output unit Tp is divided into the positive-side charging input unit Tip and the positive-side discharging output unit Top, and the positive-side charging input unit Tip is connected between the positive terminal of the secondary battery B1 and the first terminal of the first output-unit switch S11, not to the second terminals of the first output-unit switches S11 to S15, and in that the negative-side input-output unit Tn is divided into the negative-side charging input unit Tin and the negative-side discharging output unit Ton, and the negative-side charging input unit Tin is connected between the negative terminal of the secondary battery B5 and the first terminal of the second output-unit switch S25, not to the second terminals of the second output-unit switches S21 to S25.

As a result, even if the normal secondary batteries B1, B3, and B5 and the faulty secondary batteries B2 and B4 are arranged in the order of the secondary batteries B1 to B5, the first output-unit switches S1 and the second output-unit switches S2 are used to detour the secondary batteries B2 and B4 and route the electric current for series connections of the secondary batteries B1, B3, and B5, for example, to the side of the positive terminal of the secondary battery B2 and to the side of the negative terminal of the secondary battery B4, or to the side of the negative terminal of the secondary battery B2 and to the side of the positive terminal of the secondary battery B4, so that the secondary battery B3, which is disposed between the secondary batteries B2 and B4, is connected to the secondary batteries B1 and B5 in series. In this way, all the normal secondary batteries B1, B3, and B5 are connected in series, and also connection of the secondary batteries are switchable between series and parallel. Therefore, a relatively high electric current may be restricted from flowing back through any of the secondary batteries B1, B3, and B5 even when the secondary batteries B1, B3, and B5 are connected in parallel to one another for discharge after the secondary batteries B1, B3, and B5 are charged.

The scope of the present disclosure is not limited to the embodiment described above, but is intended to include various improvements and modifications within the scope of the present disclosure in essence without deviation.

What is claimed is:

1. A secondary battery system of connecting a plurality of secondary batteries in series or in parallel to one another, comprising:
    a plurality of first output-unit switches, first terminals of which are connected to respective positive terminals of the plurality of secondary batteries;
    a plurality of second output-unit switches, first terminals of which are connected to respective negative terminals of the plurality of secondary batteries;
    a plurality of series-connection switches, each of which is connected between the negative terminal of one of any two of the plurality of secondary batteries adjacent to each other and the positive terminal of the other of the two of the plurality of secondary batteries;
    a positive-side discharging output unit connected to second terminals of the plurality of first output-unit switches;
    a negative-side discharging output unit connected to second terminals of the plurality of second output-unit switches;
    a positive-side charging input unit connected between the positive terminal of one of the plurality of secondary batteries that is disposed at one end of the plurality of secondary batteries and the first terminal of one of the plurality of first output-unit switches that is associated with the one of the plurality of secondary batteries disposed at the one end of the plurality of secondary batteries;
    a negative-side charging input unit connected between the negative terminal of one of the plurality of secondary batteries that is disposed at the other end of the plurality of secondary batteries and the first terminal of one of the plurality of second output-unit switches that is associated with the one of the plurality of secondary batteries disposed at the other end of the plurality of secondary batteries; and
    a control unit that turns on the plurality of series-connection switches to conduct electric current and turns off the plurality of first output-unit switches and the plurality of second output-unit switches to block the electric current when the plurality of secondary batteries is to be connected in series to one another, and that turns on the plurality of first output-unit switches and the plurality of second output-unit switches to conduct the electric current and turns off the plurality of series-connection switches to block the electric current when the plurality of secondary batteries is to be connected in parallel to one another, wherein,
    when the plurality of secondary batteries include a first secondary battery, a second secondary battery, a third secondary battery, a fourth secondary battery, and a fifth secondary battery that are arranged in this order, and also
    when the first secondary battery, the third secondary battery, and the fifth secondary battery are to be connected in series to one another,
    the control unit turns on, to conduct the electric current, part of the plurality of first output-unit switches that are connected to the positive terminals of the second secondary battery and the third secondary battery, part of the plurality of second output-unit switches that are connected to the negative terminals of the third secondary battery and the fourth secondary battery, one of the plurality of series-connection switches that is connected between the first secondary battery and the second secondary battery, and one of the plurality of series-connection switches that is connected between the fourth secondary battery and the fifth secondary battery, and turns off, to block the electric current, part of the plurality of first output-unit switches that are connected to the positive terminals of the first secondary battery, the fourth secondary battery, and the fifth secondary battery, part of the plurality of second output-unit switches that are connected to the negative terminals of the first secondary battery, the second secondary battery, and the fifth secondary battery, one of the plurality of series-connection switches connected between the second secondary battery and the third secondary battery, and one of the plurality of series-connection switches connected between the third secondary battery and the fourth secondary battery.

2. The secondary battery system according to claim 1, wherein
    each of the plurality of first output-unit switches and the plurality of second output-unit switches includes a first semiconductor switch and a second semiconductor switch that are connected in series to each other, the first semiconductor switch including a first diode connected between a source terminal and a drain terminal of the first semiconductor switch, the second semiconductor switch including a second diode connected between a source terminal and a drain terminal of the second semiconductor switch, and a forward electric current of the second diode flowing in a direction opposite to a forward electric current of the first diode.

3. A secondary battery system of connecting a plurality of secondary batteries in series or in parallel to one another, comprising:
    a plurality of first output-unit switches, first terminals of which are connected to respective positive terminals of the plurality of secondary batteries;
    a plurality of second output-unit switches, first terminals of which are connected to respective negative terminals of the plurality of secondary batteries;
    a plurality of series-connection switches, each of which is connected between the negative terminal of one of any two of the plurality of secondary batteries adjacent to each other and the positive terminal of the other of the two of the plurality of secondary batteries;
    a positive-side discharging output unit connected to second terminals of the plurality of first output-unit switches;
    a negative-side discharging output unit connected to second terminals of the plurality of second output-unit switches;
    a positive-side charging input unit connected between the positive terminal of one of the plurality of secondary batteries that is disposed at one end of the plurality of secondary batteries and the first terminal of one of the plurality of first output-unit switches that is associated with the one of the plurality of secondary batteries disposed at the one end of the plurality of secondary batteries;
    a negative-side charging input unit connected between the negative terminal of one of the plurality of secondary batteries that is disposed at the other end of the plurality of secondary batteries and the first terminal of one of the plurality of second output-unit switches that is associated with the one of the plurality of secondary batteries disposed at the other end of the plurality of secondary batteries; and a control unit that turns on the plurality of series-connection switches to conduct electric current and turns off the plurality of first output-unit switches and the plurality of second output-unit switches to block the electric current when the plurality of secondary batteries is to be connected in series to one another, and that turns on the plurality of first output-unit switches and the plurality of second output-unit switches to conduct the electric current and turns off the plurality of series-connection switches to block the electric current when the plurality of secondary batteries is to be connected in parallel to one another, wherein, when the plurality of secondary batteries include a first secondary battery, a second secondary battery, a third secondary battery, a fourth secondary battery, and a fifth secondary battery that are arranged in this order, and also when the first secondary battery, the third secondary battery, and the fifth secondary battery are connected in series to one another, the control unit turns on, to conduct the electric current, part of the plurality of first output-unit switches that are connected to the positive terminals of the fourth secondary battery and the fifth secondary battery, part of the plurality of second output-unit switches that are connected to the negative terminals of the first secondary battery and the second secondary battery, one of the plurality of series-connection switches that is connected between the second secondary battery and the third secondary battery, and one of the plurality of series-connection switches that is connected between the third secondary battery and the fourth secondary battery, and turns off, to block the electric current, part of the plurality of first output-unit switches that are connected to the positive terminals of the first secondary battery to the third secondary battery, part of the plurality of second output-unit switches that are connected to the negative terminals of the third secondary battery to the fifth secondary battery, one of the plurality of series-connection switches that is connected between the first secondary battery and the second secondary battery, and one of the plurality of series-connection switches that is connected between the fourth secondary battery and the fifth secondary battery.

4. The secondary battery system according to claim 3, wherein
each of the plurality of first output-unit switches and the plurality of second output-unit switches includes a first semiconductor switch and a second semiconductor switch that are connected in series to each other, the first semiconductor switch including a first diode connected between a source terminal and a drain terminal of the first semiconductor switch, the second semiconductor switch including a second diode connected between a source terminal and a drain terminal of the second semiconductor switch, and a forward electric current of the second diode flowing in a direction opposite to a forward electric current of the first diode.

5. The secondary battery system according to claim 3, wherein
the control unit controls the plurality of first output-unit switches, the plurality of second output-unit switches, and the plurality of series-connection switches to connect the plurality of secondary batteries in series to one another when the plurality of secondary batteries is to be charged, and to connect the plurality of secondary batteries in parallel to one another when the plurality of secondary batteries is to be discharged.

6. The secondary battery system according to claim 1, wherein
the control unit controls the plurality of first output-unit switches, the plurality of second output-unit switches, and the plurality of series-connection switches to connect the plurality of secondary batteries in series to one another when the plurality of secondary batteries is to be charged, and to connect the plurality of secondary batteries in parallel to one another when the plurality of secondary batteries is to be discharged.

* * * * *